(12) United States Patent  
Lin

(10) Patent No.: US 11,187,577 B2  
(45) Date of Patent: Nov. 30, 2021

(54) SENSING SYSTEM, ELECTRONIC DEVICE AND SENSING METHOD FOR SENSING AMBIENT LIGHT

(71) Applicant: Silergy Semiconductor Technology (Hangzhou) LTD, Hangzhou (CN)

(72) Inventor: Suyi Lin, Hsinchu (TW)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/530,087

(22) Filed: Aug. 2, 2019

(65) Prior Publication Data

US 2020/0056936 A1   Feb. 20, 2020

(30) Foreign Application Priority Data

Aug. 17, 2018   (CN) .......................... 201810941937.7

(51) Int. Cl.  
*G01J 1/42* (2006.01)  
*G01J 1/44* (2006.01)  
*G09G 5/10* (2006.01)

(52) U.S. Cl.  
CPC ........... *G01J 1/4204* (2013.01); *G01J 1/4228* (2013.01); *G01J 1/44* (2013.01); *G09G 5/10* (2013.01); *G09G 2360/144* (2013.01); *G09G 2360/145* (2013.01); *G09G 2360/16* (2013.01)

(58) Field of Classification Search  
CPC .......... G01J 1/4204; G01J 1/4228; G01J 1/44; G09G 5/10; G09G 2360/145; G09G 2360/16  
See application file for complete search history.

(56) References Cited

U.S. PATENT DOCUMENTS

| 9,361,609 | B2 | 6/2016 | Franklin et al. |
| 9,805,630 | B2 | 10/2017 | Franklin et al. |
| 2008/0043491 | A1 | 2/2008 | Lin |
| 2009/0242370 | A1 | 10/2009 | Chiang |
| 2011/0199350 | A1* | 8/2011 | Wilson ..................... G09G 5/02 345/207 |
| 2012/0294579 | A1 | 11/2012 | Chen |
| 2014/0055408 | A1 | 2/2014 | Liu et al. |
| 2017/0229059 | A1* | 8/2017 | Bonnier ................. G06F 3/017 |
| 2018/0274974 | A1* | 9/2018 | Wang ........................ G01J 1/44 |

* cited by examiner

Primary Examiner — Kenneth B Lee, Jr.

(57) ABSTRACT

A method of sensing ambient light intensity of an ambient in which an electronic device is located, can include: providing a plurality of light sensing elements under a display screen of the electronic device; displaying a solid color image during an operating period of the display screen; obtaining first data of each of the plurality of light sensing elements in response to a current ambient light during the display screen displaying the solid color image; obtaining second data of each of the plurality of light sensing elements in response to the current ambient light during the display screen displaying a normal image; and performing mathematical operations on the first data and the second data to obtain an intensity value of the ambient light of the ambient in which the electronic device is located.

20 Claims, 5 Drawing Sheets

|  | PD | | | | |
|---|---|---|---|---|---|
|  | PD1 | PD2 | | | |
|  | A | B | C | D | E=A-(B+C+D) |
| First data | 8.5 | 4 | 2 | 1 | E1=1.5 |
| Second data | 420 | 200 | 140 | 50 | E2=30 |
| Ratio | | R=E2/E1 | | | R=20 |
| Third data | 170 | 80 | 40 | 20 | 30 |

FIG. 5

SENSING SYSTEM, ELECTRONIC DEVICE AND SENSING METHOD FOR SENSING AMBIENT LIGHT

RELATED APPLICATIONS

This application claims the benefit of Chinese Patent Application No. 201810941937.7, filed on Aug. 17, 2018, which is incorporated herein by reference in its entirety.

FIELD OF THE INVENTION

The present invention generally relates to semiconductors, and more particularly to sensing systems, electronic devices, and sensing methods for sensing ambient light.

BACKGROUND

In the process of a displayable electronic device, such as a mobile phone, being used, the brightness of its display screen may need to be adjusted to satisfy the user's needs when applied in different ambient light. Typically, in order to realize the comprehensive screen design of the electronic device, the ambient light sensing system may be disposed under the transparent display screen to sense the brightness of the ambient light. However, the light source of the display panel may interfere with the sensing of ambient light in such an arrangement.

BRIEF DESCRIPTION OF THE DRAWINGS

FIG. 5 is an operational summary table of an example sensing method, in accordance with embodiments of the present invention.

DETAILED DESCRIPTION

Figure 1:
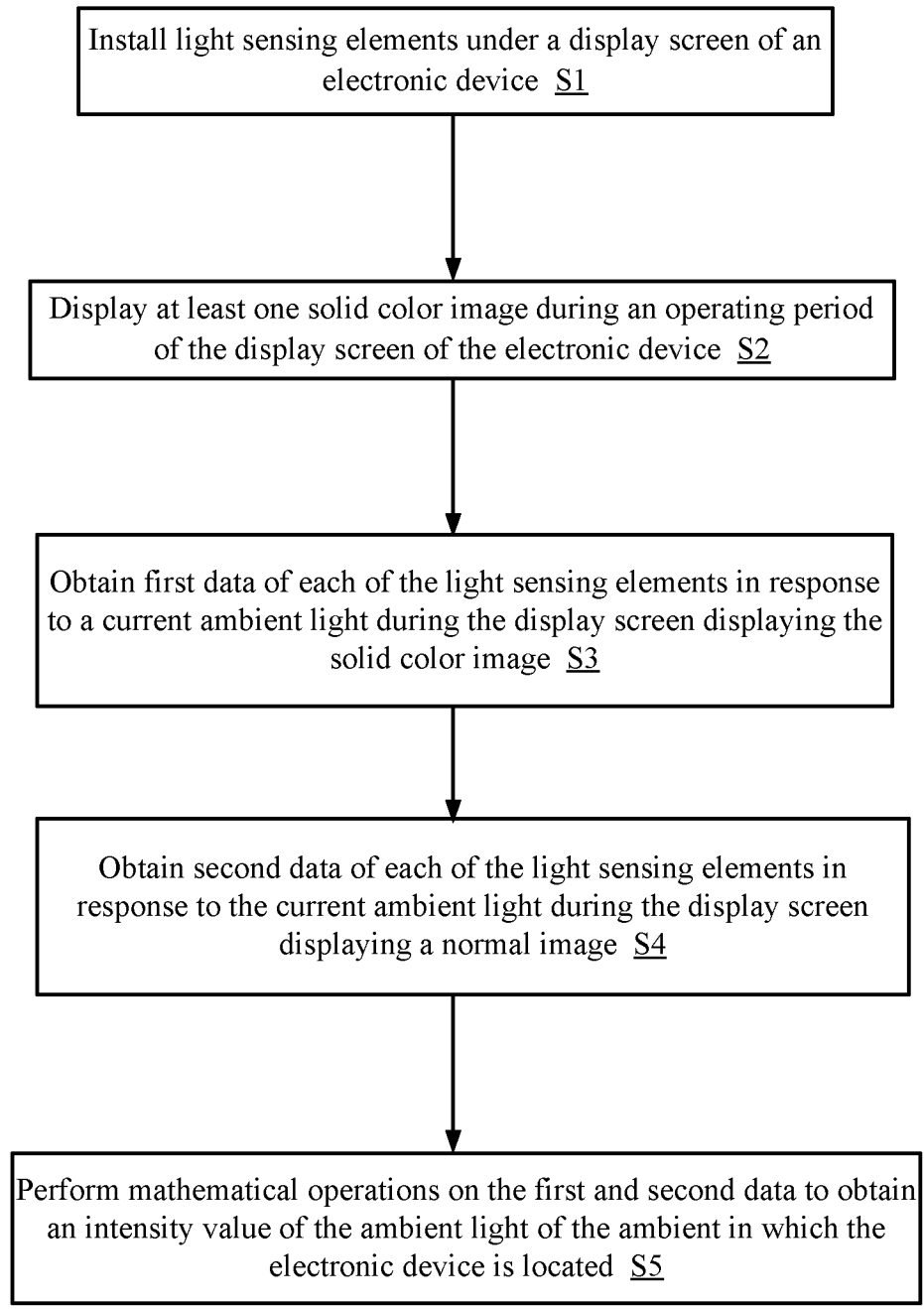
FIG. 1 is a flow diagram of an example method of sensing ambient light brightness in an ambient in which an electronic device is located, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one approach, one or more black images may be inserted in the display screen of the display panel, and then the ambient light may be sensed under the full black image, in order to avoid influence of the light of the display panel on ambient light sensing. However, the ambient light sensing system may need a certain sensing time in order to sense the ambient light. Thus, the display time required for each black image should be at least greater than the sensing time. As a result, the normal sensing of the ambient light may not be affected by the sudden full black image. However, the relatively long period of a black image can affect the user's normal use of the display.

In addition, in an ambient where the ambient light changes rapidly, the above sensing time may be in a relatively low level period of an ambient light source switch control signal. As a result, the sensed value may be much lower than the actual value. Also, the above sensing time may be in a relatively high level of the ambient light source switch control signal, so the sensed value may be much greater than the actual value. Therefore, even if the ambient light is sensed in a black image, the sensed ambient light brightness value may not be true in an application ambient whereby the ambient light changes rapidly.

In one embodiment, a method of sensing ambient light intensity of an ambient in which an electronic device is located, can include: (i) installing (or otherwise providing) a plurality of light sensing elements under a display screen of the electronic device; (ii) displaying a solid color image during an operating period of the display screen; (iii) obtaining first data of each of the plurality of light sensing elements in response to a current ambient light during the display screen displaying the solid color image; (iv) obtaining second data of each of the plurality of light sensing elements in response to the current ambient light during the display screen displaying a normal image; and (v) performing mathematical operations on the first data and the second data to obtain an intensity value of the ambient light of the ambient in which the electronic device is located.

Referring now to FIG. 1, shown is a flow diagram of an example method of sensing ambient light brightness in an ambient in which an electronic device is located, in accordance with embodiments of the present invention. In this particular example, at S1, light sensing elements can be installed under a display screen of the electronic device. The light sensing elements can be photoelectric conversion devices, such as photoelectric conversion diodes, and different filters may be disposed on the photosensitive surface of the light sensing elements, such that different light sensing elements can respond to different spectrum. For example, the light sensing elements may be divided into a first set of light sensing elements and a second set of light sensing elements.

The first set of light sensing elements can respond to the first spectrum. A wavelength range of the first spectrum can include a wavelength range of visible light as much as possible during the spectral response of the first spectrum that is greater than 20% of the peak spectral response the first spectrum. In addition, the light that the second set of light sensing elements can respond to includes light emitted by the display screen. That is, the second set of light sensing elements can respond to light emitted by the display screen. Also, a wavelength range of the first spectrum can be between 350 nm and 1,100 nm during a spectrum response of the first spectrum that is greater than 20% (e.g., 0.200 of the ordinate mark in FIGS. 2-4) of the peak spectrum response of the first spectrum.

Figure 2:
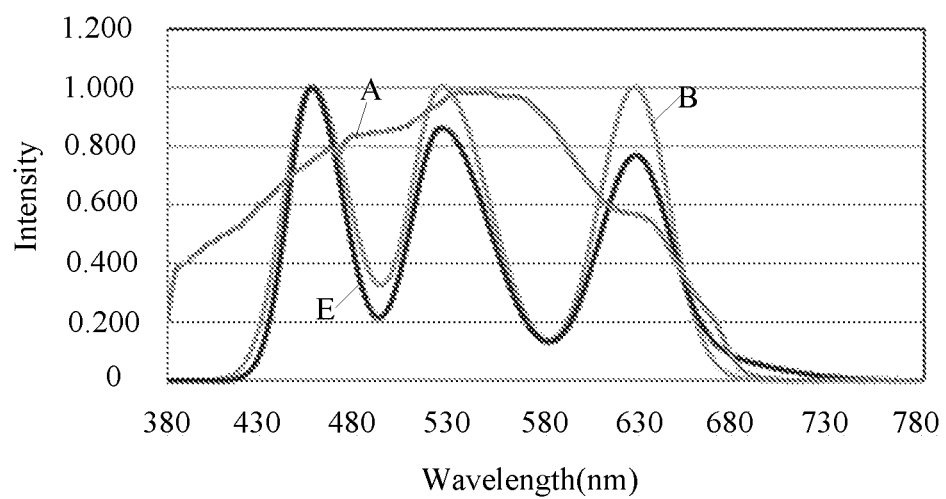
FIG. 2 is a diagram of first example spectrum response curves of each of the light sensing elements, in accordance with embodiments of the present invention.

Referring now to FIG. 2, shown is a diagram of first example spectrum response curves of each of the light sensing elements, in accordance with embodiments of the present invention. In this particular example, the first set of light sensing elements can include one light sensing element. The spectrum response curve of the light sensing element is curve A, and curve A is a spectrum curve corresponding to the first spectrum. In this particular example, when the first spectrum has a wavelength range of from about 380 nm to about 680 nm during a spectrum response of the first spectrum that is greater than 20% of the peak spectrum response of the first spectrum, the spectrum curve of the first spectrum may be relatively close to that of visible light.

The second set of light sensing elements can include one light sensing element, and the spectrum response curve of the light sensing element is curve B. For example, the light sensing element can respond to an RGB (red-green-blue) color spectrum, so curve B is an RGB color spectrum curve. In addition, curve E is the spectrum curve of the light emitted by the display screen, which also can be an RGB color spectrum curve. For example, the wavelength range of curve B and the wavelength range of curve E may be substantially the same during the spectrum response that is greater than 20% of the peak spectrum response. Further, the wavelengths corresponding to the peak response locations of curves B and E may also be relatively close, such that the second set of light sensing elements can respond to light emitted by the display screen.

Figure 3:
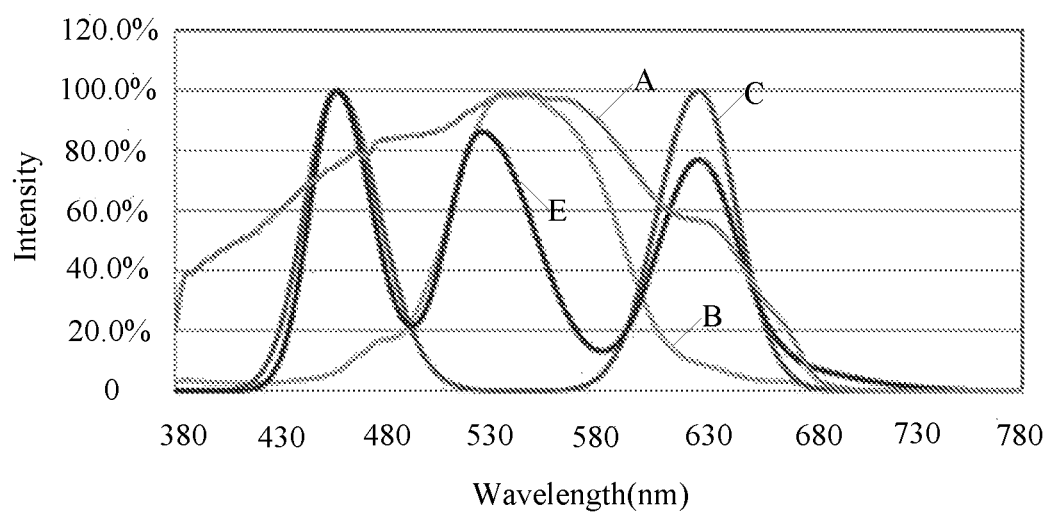
FIG. 3 is a diagram of second example spectrum response curves of each of the light sensing elements, in accordance with embodiments of the present invention.

Referring now to FIG. 3, shown is a diagram of second example spectrum response curves of each of the light sensing elements, in accordance with embodiments of the present invention. In this particular example, the second set of light sensing elements can include two light sensing elements, and the light emitted by the display screen can generally be RGB color light composed of three spectrums of red light, green light, and blue light. One light sensing element of the second set of light sensing elements may respond to one of the second, third, and fourth spectrums, while the other light sensing element of second set of light sensing elements may respond to the other two of the second, third, and fourth spectrums.

For example, a wavelength range of the second spectrum is between 450 nm and 620 nm during a spectral response of the second spectrum that is greater than 20% of the peak spectral response of the second spectrum. Also for example, a wavelength range of the third spectrum is between 550 nm and 1,100 nm during a spectral response of the third spectrum that is greater than 20% of the peak spectral response of the third spectrum. Also for example, a wavelength range of the fourth spectrum is between 350 nm and 540 nm during a spectral response of the fourth spectrum that is greater than 20% of the peak spectral response of the fourth spectrum.

In order to facilitate subsequent mathematical operations, as shown in FIG. 3, the second spectrum can be a green light spectrum, the third spectrum can be a red light spectrum, and the fourth spectrum can be a blue light spectrum. One of the second set of light sensing elements can response to the green light spectrum, and the spectrum response curve is curve B. the other light sensing element of the second set of light sensing elements can respond to the red and blue light spectrums, and the spectrum response curve is curve C. The superposition of the spectrum response curves of the two light sensing elements of the second set of light sensing elements can be relatively close to the spectrum response curve E of the light emitted by the display screen, and the former may generally include the latter.

Figure 4:
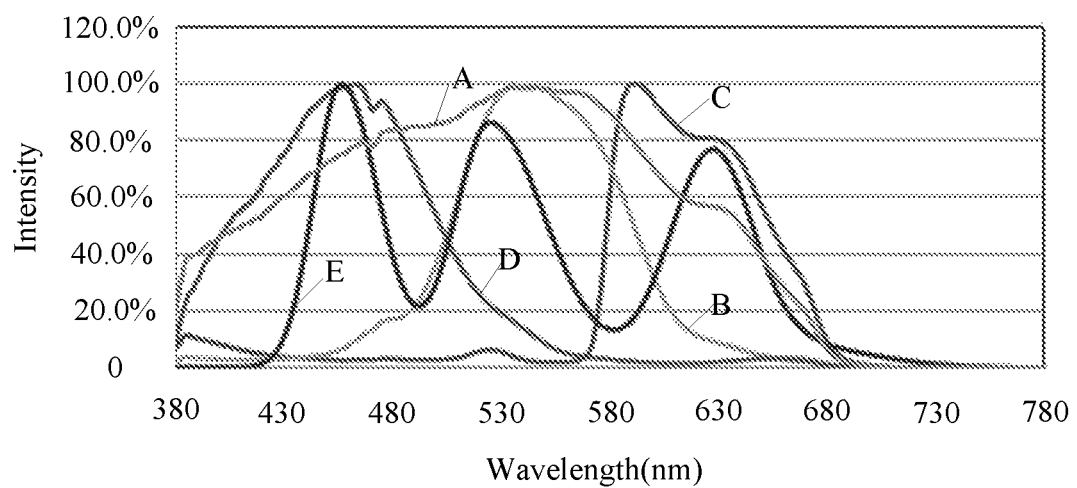
FIG. 4 is a diagram of third example spectrum response curves of each of the light sensing elements, in accordance with embodiments of the present invention.

Referring now to FIG. 4, shown is a diagram of third example spectrum response curves of each of the light sensing elements, in accordance with embodiments of the present invention. In this particular example, the second set of light sensing elements can include three light sensing elements. Since the light emitted by the display screen may generally be RGB color light composed of red light, green light and blue light, the first light sensing element of the second set of light sensing elements can respond to the second spectrum. Also, the second light sensing element of the second set of light sensing elements can respond to the third spectrum. In addition, the third light sensing element of the second set of light sensing elements can respond to the fourth spectrum.

For example, a wavelength range of the second spectrum is between 450 nm and 620 nm during a spectral response of the second spectrum that is greater than 20% of the peak spectral response of the second spectrum. Also for example, a wavelength range of the third spectrum is between 550 nm and 1,100 nm during a spectral response of the third spectrum that is greater than 20% of the peak spectral response of the third spectrum. Also for example a wavelength range of the fourth spectrum is between 350 nm and 540 nm during a spectral response of the fourth spectrum that is greater than 20% of the peak spectral response of the fourth spectrum. In this particular example, the second spectrum is a green light spectrum, and the corresponding spectrum response curve is curve B, the third spectrum is a red light spectrum, and the corresponding spectrum response curve is curve C, and the fourth spectrum is a blue light spectrum, and corresponding spectrum response curve is curve D. The superposition of the spectrum response curves generated by the three light sensing elements of the second set of light sensing elements may be relatively close to the spectrum response curve E of the light emitted by the display screen, and the former may generally include the latter.

In other examples, the first set of light sensing elements may also include a plurality of light sensing elements, and the superposition of the spectrum response curves of each light sensing element of the first set of light sensing elements can be substantially close to the spectrum response curve of the visible light. The second set of light sensing elements may further include three or more light sensing elements, as long as all of the light sensed by each of the light sensing elements of the second set of light sensing elements includes the light emitted by the display screen.

Referring back to FIG. 1, at S2, at least one solid color image can be displayed during an operating period of the display screen of the electronic device. For example, the display screen can display from about 30 to about 240 images per second, and one or more solid color images can be inserted in the, e.g., 30 to 240 images appearing every second, while the number of the inserted solid color images may not be detected by the human eye. In order to facilitate subsequent mathematical operations, the solid color image may be a full black image to avoid the effects of the light source of the display screen on ambient light.

At S3, first data of each of the light sensing elements can be obtained in response to a current ambient light during the display screen displaying the solid color image. When the display screen is in a solid color image (e.g., a full black image), the control circuit of each of the light sensing elements can control each of the light sensing elements to respond to the current ambient light, in order to generate response data as the first data. The first data generated by the first set of light sensing elements is a first set of first data, and the first data generated by the second set of light sensing elements is a second set of first data.

For example, at S1, the first set of first data can include one first data, and the second set of first data also can include one first data. In another example of S1, the first set of first data can include one first data, and the second set of first data can include two first data. In another example of S1, the first set of first data can include one first data, and the second set of first data can include three first data. Since each of solid color image may last for a relatively short time, each of the first data may be the response data of each of light sensing elements to the current ambient light during successively several solid color images. However, due to the duration of each of solid color image being relatively short, and the number of the solid color images inserted being limited, even if a full black image is inserted and the influence of the light of the display screen on the ambient light sensing is substantially avoided, each of the first data may not be a sensed value of real ambient light (e.g., ambient light deducting light emitted by the display screen) due to the sensing time being relatively short.

At S4, second data of each of the light sensing elements can be obtained in response to the current ambient light during the display screen displaying a normal image. When a normal image (e.g., an image displayed according to user requirements) displays on the display screen, and the control circuit of each of the light sensing elements controls each of the light sensing elements to respond to the current ambient light to generate the corresponding response data as the second data, the current ambient light can include the light emitted by the display screen. The second data generated by the first set of light sensing elements can be a first set of second data, and the second data generated by the second set of light sensing elements can be a second set of second data. For example, at S1, the first set of second data can include one second data, and the second set of second data also includes one second data. In another example of S1, the first set of second data can include one second data, and the second set of second data includes two second data. In another example of S1, the first set of second data can include one first data, and the second set of second data can include three second data.

At S5, mathematical operations on the first data and the second data can be performed in order to obtain an intensity value of the ambient light of the ambient in which the electronic device is located. Performing mathematical operations on the first data and the second data can include performing mathematical operations on the first set of first data, the second set of first data, the first set of second data, and the second set of second data to obtain a third data. For example, the third data corresponds to the ambient light deducted the light emitted by the display screen, and the intensity value of the ambient light can be obtained according to the third data.

The performing of the mathematical operations on the first set of first data, the second set of first data, the first set of second data, and the second set of second data can include performing a difference calculation between the sum of the first set of first data and the sum of the second set of first data to obtain a first difference value. This performing mathematical operations can also include performing a difference calculation between the sum of the first set of second data and the sum of the second set of second data is performed in order to obtain a second difference value. This performing mathematical operations can also include performing a ratio calculation of the second difference value to the first difference value is performed to obtain a ratio value. This performing mathematical operations can also include performing a multiplication calculation of the ratio value and the first data is performed to obtain the third data.

Referring now to FIG. 5, shown is an operational summary table of an example sensing method, in accordance with embodiments of the present invention. The light sensing elements PD can be divided into a first set of light sensing elements PD1 and a second set of light sensing elements PD2. The first set of light sensing elements PD1 can include one light sensing element A, and the second set of light sensing elements PD2 can include three light sensing elements, which are respectively light sensing element B for responding to the green light spectrum, light sensing element C for responding to the red light spectrum, and light sensing element D for responding to the blue light spectrum.

In this example table, the first set of first data includes 8.5, so the sum of the first set of first data is 8.5. Also, the second set of first data includes 4, 2, and 1, so the sum of the second set of first data is 7. Therefore, the first difference value E1 in this example is 1.5. The first set of second data includes 420, so the sum of the first set of second data is 420. Also, the second set of second data includes 200, 140, 50, so the sum of the second set of second data is 390. Therefore, the second difference value E2 in this particular example is 30. Although each of the first data may not be an accurate sensing value because the sensing time is relatively short, the ratio between each of the first data may be accurate, such that the true ambient light sensing value can be each of the first data multiplied by a predetermined ratio.

The sensing time of each of the second data may last longer, such that each of the second data is an accurate sensing value for the current ambient light. However, the current ambient light can include light emitted by the display screen, such that the current second data may not reflect the real brightness value of the ambient light (e.g., pure ambient light that does not contain the light emitted by the display screen). The ratio value in this example can be obtained by the ratio of difference value E2 to difference value E1. Thus for example, ratio value R is 20, and the third data can include one or more of third data 170 of light sensing element A, third data 80 of light sensing element B, third data 40 of the light sensing element C, and third data 20 of light sensing element D.

In some cases, it may not be necessary to multiply each of the first data by the ratio value to obtain a third data, and the first data that needs to be multiplied by the ratio value may be selected according to particular application requirements. For example, in order to facilitate the subsequent calculation of the intensity value of the ambient light, the green light spectrum can be relatively close to the visible light spectrum, such that only the first data of the light sensing element B may be multiplied by the ratio value to obtain the third data. The intensity value of the ambient light can then be obtained according to the third data. One of the light sensing elements can be used to respond to the second spectrum described in the various examples above, and the second spectrum is, e.g., the green light spectrum.

In addition, mathematical operations on the first set of first data, the second set of first data, the first set of second data, and the second set of second data can be performed in order to obtain backlight characterization data representing the backlight intensity of the light emitted by the display screen when displaying a normal image. Also, the intensity value of the ambient light of the ambient in which the electronic device is located can be obtained in accordance with the second data and the characterization data.

For example, the performing mathematical operations on the first set of first data, the second set of first data, the first set of second data, and the second set of second data can include performing a difference calculation between a sum of the first set of first data and a sum of the second set of first data, in order to obtain a first difference value. The performing the mathematical operations can also include performing a difference calculation between a sum of the first set of second data and a sum of the second set of second data to obtain a second difference value, calculating a ratio of the second difference value to the first difference value to obtain a ratio value, and multiplying the ratio value by the first data to obtain the third data. The backlight characterization data can be obtained in accordance with a difference value between the second data and the third data.

An ambient light characterization value representing the ambient light intensity of the ambient in which electronic device located excluding the light emitted by the display screen can be obtained in accordance with difference value between the second data and the backlight characterization data. Also, the ambient light intensity value of the ambient in which electronic device located excluding the light emitted by the display screen can be obtained in accordance with the ambient light characterization value.

In particular embodiments, one or more solid color images may be inserted during normal operation of the display screen. When the solid color image appears on the display screen, multiple light sensing elements can respond to the current ambient light to obtain first data. When the normal image appears on the display screen, the multiple light sensing elements can respond to the current ambient light to obtain second data. The first data and the second data may undergo mathematical operations in order to obtain the true light intensity value of the ambient light. In this way, relatively high sensing sensitivity to ambient light can be achieved in sensing methods and systems of particular embodiments.

In particular embodiments, a sensing system for ambient light can be applied under the display screen of the electronic device, and the sensing system can include light sensing elements and a control processing unit (e.g., a general-purpose processor, a controller, etc.). When the display screen displays a solid color image, each of the light sensing elements can be controlled to respond to current ambient light by the control processing unit to generate the first data. When the display screen displays a normal image, the control processing unit can control each of the light sensing elements to respond to current ambient light to generate the second data. The control processing unit can perform a mathematical operation on the first data and the second data to obtain the intensity value of an ambient light of an ambient in which the electronic device is located.

The control processing unit can perform a mathematical operation on the first set of first data, the second set of first data, the first set of second data, and the second set of second data to obtain a third data, and the intensity value of the ambient light may be obtained according to the third data. The third data can correspond to the ambient light deducted the light emitted by the display screen. The control processing unit can include a data acquisition circuit, a mathematical operation circuit, a storage circuit, and a signal processing circuit. The data acquisition circuit can acquire the first set of first data, the second set of first data, the first set of second data, and the second set of second data.

The mathematical operation circuit can perform a difference calculation between a sum of the first set of first data and a sum of the second set of first data to obtain a first difference value. The mathematical operation circuit can also perform a difference calculation between a sum of the first set of second data and a sum of the second set of second data to obtain a second difference value. The mathematical operation circuit can also perform calculating a ratio of the second difference value to the first difference value to obtain a ratio value. The mathematical operation circuit can also perform multiplying the ratio value by the first data to obtain the third date. The storage circuit can store each of the first data, and the signal processing circuit may process the third data to obtain the intensity value of the ambient light. For example, in order to facilitate calculation, the intensity value of the ambient light can be obtained from the third data of the light sensing element responding to the green light spectrum.

Particular embodiments may also provide an electronic device that includes a display screen and a sensing system as described herein. The sensing system may be disposed under the display screen. The display screen can include a display area, and the display screen may be a light transmissive display screen. The sensing system can be disposed under the display area of the display screen. The display screen can further include a frame surrounding the display area, whereby the sensing system is disposed below the frame.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of sensing ambient light intensity of an ambient in which an electronic device is located, the method comprising:
    a) installing a plurality of light sensing elements under a display screen of the electronic device;
    b) displaying a solid color image during an operating period of the display screen to form a first display condition, wherein the solid color image is a full black image to avoid effects of a light source of the display screen on the ambient light;
    c) obtaining first data of each of the plurality of light sensing elements in response to a current ambient light during the first display condition;
    d) displaying a normal image during the operating period of the display screen to form a second display condition;
    e) obtaining second data of each of the plurality of light sensing elements in response to the current ambient light during the second display condition; and
    f) performing mathematical operations on the first data and the second data to obtain an intensity value of the ambient light of the ambient in which the electronic device is located.

2. The method according to claim 1, wherein:
    a) the plurality of light sensing elements comprises a first set of light sensing elements and a second set of light sensing elements;
    b) the first set of light sensing elements is configured to respond to light of a first spectrum;
    c) the second set of light sensing elements is configured to respond to light of a second spectrum;
    d) the second spectrum comprises light emitted by the display screen;

e) the first data comprises a first set of first data from the first set of light sensing elements and a second set of first data from the second set of light sensing elements; and f) the second data comprises a first set of second data from the first set of light sensing elements and a second set of second data from the second set of light sensing elements.

3. The method according to claim 2, further comprising:
a) obtaining third data by performing mathematical operations on the first set of first data, the second set of first data, the first set of second data, and the second set of second data; and
b) obtaining the intensity value of the ambient light according to the third data, wherein the third data corresponds to the ambient light deducted by the light emitted by the display screen.

4. The method according to claim 3, further comprising:
a) obtaining a first difference value by performing a difference calculation between a sum of the first set of first data and a sum of the second set of first data;
b) obtaining a second difference value by performing a difference calculation between a sum of the first set of second data and a sum of the second set of second data;
c) obtaining a ratio value by calculating a ratio of the second difference value to the first difference value; and
d) obtaining the third data by multiplying the ratio value by the first data.

5. The method according to claim 2, wherein the first set of light sensing elements are configured to respond to the first spectrum, and a wavelength range of the first spectrum comprises a wavelength range of a visible light during a spectral response of the first spectrum that is greater than 20% of a peak spectral response of the first spectrum.

6. The method according to claim 3, wherein one of the plurality of light sensing elements is configured to respond to a second spectrum, and a wavelength range of the second spectrum is between 450 nm and 620 nm during a spectral response of the second spectrum that is greater than 20% of a peak spectral response of the second spectrum.

7. The method according to claim 6, wherein the intensity value of the ambient light is obtained in accordance with the third data of the light sensing element responding to the second spectrum.

8. The method according to claim 2, wherein one of the second set of light sensing elements is configured to respond to the RGB color spectrum.

9. The method according to claim 2, wherein:
a) one of the second set of light sensing elements is configured to respond to one of the second spectrum, a third spectrum, and a fourth spectrum;
b) another one of the second set of light sensing elements is configured to respond to the other two of the second, third, and fourth spectrums;
c) a wavelength range of the second spectrum is between 450 nm and 620 nm during a spectrum response of the second spectrum that is greater than 20% of a peak spectrum response of the second spectrum;
d) a wavelength range of the third spectrum is between 550 nm and 1,100 nm during a spectrum response of the third spectrum that is greater than 20% of a peak spectrum response of the third spectrum; and
e) a wavelength range of the fourth spectrum is between 350 nm and 540 nm during a spectrum response of the fourth spectrum that is greater than 20% of a peak spectrum response of the fourth spectrum.

10. The method according to claim 2, wherein:
a) a first light sensing element of the second set of light sensing elements is configured to respond to the second spectrum;
b) a second light sensing element of the second set of light sensing elements is configured to respond to a third spectrum;
c) a third light sensing element of the second set of light sensing elements is configured to respond to a fourth spectrum;
d) a wavelength range of the second spectrum is between 450 nm and 620 nm during a spectrum response of the second spectrum that is greater than 20% of a peak spectrum response of the second spectrum;
e) a wavelength range of the third spectrum is between 550 nm and 1,100 nm during a spectrum response of the third spectrum that is greater than 20% of a peak spectrum response of the third spectrum; and
f) a wavelength range of the fourth spectrum is between 350 nm and 540 nm during a spectrum response of the fourth spectrum that is greater than 20% of a peak spectrum response of the fourth spectrum.

11. The method according to claim 1, wherein the performing the mathematical operations comprises performing difference calculations using the first data and the second data.

12. The method according to claim 5, wherein a wavelength range of the first spectrum is between 350 nm and 1,100 nm during a spectrum response of the first spectrum that is greater than 20% of the peak spectrum response the first spectrum.

13. The method according to claim 2, further comprising:
a) performing mathematical operations on the first set of first data, the second set of first data, the first set of second data, and the second set of second data to obtain backlight characterization data representing the backlight intensity of the light emitted by the display screen when displaying a normal image; and
b) obtaining the intensity value of the ambient light of the ambient in which the electronic device is located in accordance with the second data and the characterization data.

14. The method according to claim 13, wherein the performing mathematical operations on the first set of first data, the second set of first data, the first set of second data, and the second set of second data comprises:
a) obtaining a first difference value by performing a difference calculation between a sum of the first set of first data and a sum of the second set of first data;
b) obtaining a second difference value by performing a difference calculation between a sum of the first set of second data and a sum of the second set of second data;
c) obtaining a ratio value by calculating a ratio of the second difference value to the first difference value;
d) obtaining the third data by multiplying the ratio value by the first data; and
e) obtaining the backlight characterization data in accordance with a difference value between the second data and the third data.

15. The method according to claim 13, further comprising:
a) obtaining an ambient light characterization value representing the ambient light intensity of the ambient in which electronic device located excluding the light emitted by the display screen in accordance with a difference value between the second data and the backlight characterization data; and b) obtaining the ambient light intensity value of the ambient in which electronic device located excluding the light emitted by the display screen in accordance with the ambient light characterization value.

16. A sensing system for ambient light, the sensing system being installed under a display screen of an electronic device, the sensing system comprising a plurality of light sensing elements and a control processing unit, wherein:
   a) each of the plurality of light sensing elements is controlled by the control processing unit to respond to current ambient light to generate first data under a first display condition when the display screen displays a solid color image, wherein the solid color image is a full black image to avoid effects of a light source of the display screen on the ambient light;
   b) each of the plurality of light sensing elements is controlled by the control processing unit to respond to current ambient light to generate second data under a second display condition when the display screen displays a normal image; and
   c) the control processing unit is configured to perform mathematical operations on the first data and the second data to obtain an intensity value of an ambient light of an ambient in which the electronic device is located.

17. The sensing system according to claim 16, wherein the second set of light sensing elements is configured to respond to light emitted by the display screen.

18. The sensing system according to claim 16, wherein:
   a) the first data comprises a first set of first data from the first set of light sensing elements and a second set of first data from the second set of light sensing elements;
   b) the second data comprises a first set of second data from the first set of light sensing elements and a second set of second data from the second set of light sensing elements;
   c) mathematical operations on the first set of first data, the second set of first data, the first set of second data, and the second set of second data are performed by the control processing unit to obtain a third data; and
   d) the intensity value of the ambient light is obtained in accordance with the third data, wherein the third data corresponds to the ambient light deducted by the light emitted by the display screen.

19. The sensing system according to claim 18, the control processing unit comprises:
   a) a data acquisition circuit configured to acquire the first set of first data, the second set of first data, the first set of second data, and the second set of second data;
   b) a mathematical operation circuit configured to perform a difference calculation between a sum of the first set of first data and a sum of the second set of first data to obtain a first difference value, perform a difference calculation between a sum of the first set of second data and a sum of the second set of second data to obtain a second difference value, calculate a ratio of the second difference value to the first difference value to obtain a ratio value, and multiply the ratio value by the first data to obtain the third data;
   c) a storage circuit configured to store each of the first, second, and third data; and
   d) a signal processing circuit configured to process the third data to obtain the intensity value of the ambient light.

20. The sensing system according to claim 18, wherein the first set of light sensing elements are configured to respond to a first spectrum, and a wavelength range of the first spectrum comprises a wavelength range of a visible light during a spectral response of the first spectrum that is greater than 20% of a peak spectral response of the first spectrum.

* * * * *